Oct. 20, 1959  A. P. MAZZUCCHELLI ET AL  2,909,752
RESISTANCE HEATING OF PLASTIC-METAL FIBER
ARTICLES AND ARTICLES MADE THEREBY
Filed Aug. 30, 1957

Inventors:
ARTHUR P. MAZZUCCHELLI
THOMAS E. BUGEL
LOUIS ROSENTHAL

By Walter C. Kehm
Attorney

United States Patent Office 2,909,752
Patented Oct. 20, 1959

2,909,752

RESISTANCE HEATING OF PLASTIC-METAL FIBER ARTICLES AND ARTICLES MADE THEREBY

Arthur P. Mazzucchelli, Scotch Plains, Thomas E. Bugel, Montclair, and Louis Rosenthal, Highland Park, N.J., assignors to Union Carbide Corporation, a corporation of New York Application August 30, 1957, Serial No. 681,221

14 Claims. (Cl. 338—226)

This invention relates to a novel method for preparing plastic-metal fiber composite articles and to the novel articles made thereby. More especially, this invention relates to forming such articles by a process involving passing an electric current through the composite articles during their formation.

In order to overcome certain inherent weaknesses of plastic articles made from epoxy resins and polymerizable polyesters such as styrenated unsaturated polyesters, the suggestion has already been made to incorporate steel or other heat-conducting metals in wool or fiber form into the resin, the resulting resin-metal fiber mixture then being cast to form an integral metal-containing plastic die, etc. The casting process consists of two basic steps: (1) the resin-metal fibers mixture is placed under pressure and permitted to stand under adiabatic conditions for a few hours, whereby a partial curing of the resin and an integral formed composite result; and (2) the formed composite is then placed in an oven at an elevated temperature for a period of time sufficient to complete the cure, pressure being applied in this step except in those cases where the castings are large, i.e., of the order of 1 cubic foot or larger.

The necessity for moving the bulky casting to a suitable heat source to effect the aforesaid step 2 is disadvantageous from the practical point of view. For one thing, it involves a moving operation which in itself is useless as it does not further the process. If the first step is conducted in an unheated oven and the oven is then turned on, this, to be sure, obviates the necessity to move the casting, but is undesirable as an inefficient, part-time use of the oven. Another disadvantage of the aforesaid 2-step curing method is that it is inflexible in nature because it does not allow the simultaneous curing of different castings in the same oven under optimum curing conditions, but, instead, only permits one set of temperature conditions to be used with respect to all the castings in the oven. As can be easily appreciated, the optimum curing cycle for different castings will vary, depending on their size and configuration and on the nature and relative amounts of the materials employed in their formulation. Here too, it is theoretically possible to avoid this just-stated disadvantage but only at the expense of incurring an equally-undesirable new disadvantage. Reference is made to the fact that a plurality of ovens may be used, each oven being employed to cure a particular casting or a number of duplicate castings. This is not economically feasible as an undue amount of space will be required for adequate oven capacity.

Other disadvantages of conventional heating methods include the need for large ovens, the tendency of the metal-plastic articles to case harden as a result of oven heating, and the setting up of strains in the casting due to uneven heating.

We have succeeded in overcoming the stated disadvantages by passing an electric current through the aforesaid formed composite and thereby completing the cure. It will be appreciated that the casting need not be moved in order to conduct this step. Further, by varying the current, the amount of heat generated in each composite may be individually controlled so as to result in the optimum curing cycle for every casting.

In addition to overcoming the aforementioned disadvantages our present invention has resulted in articles which not only possess the properties which the prior resin-metal fiber composites possess, but our novel articles have the additional property of acting as radiant heaters when placed in an electrical circuit. Thus, our novel articles, like the prior similar articles, have high specific gravity; high impact-, wear- and abrasion-resistance; high thermal conductivity and electrical conductance; and can be drilled, machined, turned, filed, sawed, polished and finished much like a solid metal article, only with greater ease. However, our novel articles, unlike the aforementioned prior similar ones, have the property of conducting electrical currents and can be used as room heaters, either of the portable or permanently built-in type, such as wall panel heaters.

The resin employed in accordance with this invention is a thermosetting resin selected from the class consisting of epoxy resins and polyesters.

The epoxy resins of commerce today can be divided into two broad classes of resin: liquid resins and brittle solid resins.

Chemically, the two classes of epoxy resins are similar enough that a generalized formula can be written for both as follows:

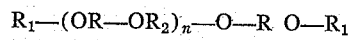

$$R_1-(OR-OR_2)_n-O-R\ O-R_1$$

where R is the residue of a dihydric phenol, $R_2$ is an intermediate hydroxyl containing residue of a chlorohydrin or dichlorohydrin, and $R_1$ is mainly an epoxy-containing residue and to some extent a hydroxyl-containing residue derived from the chlorohydrin. In the above formula $n$ represents the extent of polymerization.

We regard as liquid epoxy resins or as low melting solid epoxy resins those having a value of $n$ from 0 to about 1. We regard as brittle solid epoxy resins those having a value of $n$ from about 2 to about 20.

The dihydric phenols used in making the epoxy resins may contain the hydroxy groups in one nucleus, as in resorcinol, or in different nuclei of either fused ring systems or ring systems connected by chains composed of one or more atoms. Illustrative of dihydric phenols which may be used in making the complex polymerization products are mononuclear phenols such as resorcinol, hydroquinone, phloroglucinol, etc., and polynuclear phenols such as bisphenol A [2,2-di (4-hydroxy phenyl) propane], p,p'-dihydroxy benzophenone, p,p'-dihydroxy diphenyl, p,p'dihydroxy dibenzyl, and the like.

The difunctional or polyfunctional chlorohydrins used in making the epoxy resins include epichlorohydrin, glycerol dichlorohydrin and the like.

The curing of epoxy resins may be divided into two classes—curing with hardeners and curing by catalysts. Hardeners are defined as polyfunctional compounds which are used with an epoxy resin in a stoichiometric or near stoichiometric ratio. Illustrative of hardeners are polyhydric phenols such as resorcinol; bisphenol A and the like; polybasic acids or their anhydrides such as maleic anhydride, phthalic anhydride, etc.; polyamines containing an active amino hydrogen such as ethylene diamine, diethylene diamine, etc.; polyhydric alcohols and polythiols. Catalysts are defined as compounds that cause the epoxy to self-polymerize. They may be monofunctional and are always used in much lower amounts than stoichiometric. Illustrative of catalysts are the amines, such as trimethyl amine, triethyl amine, etc., alkalies and alkaline reacting substances, such as sodium or potassium hydroxide, etc., boron trifluoride and a variety of others.

In addition to the liquid epoxy resins of the kind described, there have also been found suitable to our purpose the diepoxides such as those described in U.S.P. 2,716,123, 6-methyl-3,4-epoxycyclohexylmethyl - 6-methyl-3,4-epoxycyclohexane carboxylate, being illustrative.

The unsaturated polyester compositions suitable for our purpose are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents will polymerize either at room temperature or by the application of heat and slight pressure to solid infusible plastic. The polymerization is exothermic and no volatile by-products are formed. Pure glycol maleate-styrene copolymer is rather brittle, but using longer glycols or by replacing part of the maleic acid with long chain aliphatic acids such as adipic acid a tougher and more flexible resin is obtained.

The vinyl monomer in the above compositions can be diallyl phthalate which is often used to cross-link the modified maleate polyester resins.

Suitable catalysts for unsaturated polyester compositions as above described are free radical initiators such as peroxides and azo compounds, such as benzoyl peroxide, tertiary butyl perbenzoate, methyl ethyl ketone, peroxide and the like. Since most unsaturated polester compositions are unstable on storage, they usually are marketed in the liquid form and contain a stabilizing inhibitor such as tetriary butyl catechol, hydroquinone and the like. The curing catalyst is then added just prior to the intended time of using the polyester compositions.

The metal fibers employed herein comprise spun, extruded, cut or drawn filaments, either of round, rectangular or other cross-sectional forms. Their length may vary widely, both within the same and as respects different castings. Thus, fibers of lengths as short as about 1/32 to about 1/2 inch may be used and fibers, such as the metal wools of commerce having substantially continuous lengths, such as those found in the familiar metal wool, e.g., the steel wool and aluminum wool of commerce, may be used. In practice it has often been found desirable to use fibers of short lengths near the electrodes and other external surfaces of the castings, in particular in those sections having abrupt changes in surfaces, such as at corners and edges. If desired, the fibers may be compressed prior to use herein, whether in short or substantially continuous lengths.

The cross-sectional dimensions may also vary over wide limits. As an example, rod-like fibers having diameters between about 0.0005" and about 0.025", or fibers having rectangular cross-sectional dimensions from about 0.010" x 0.002" to about 0.25" x 0.015" give the desired results.

Among the specific metallic meterials which can be used in accordance with this invention we mention fibers or the aforesaid metal wools made from steel, copper, silver, stainless steel, nickel and aluminum, and alloys, such as brass and bronze.

The proportion of metal filaments in the composition may vary widely as long as sufficient metal is present to improve materially the thermal conductivity of the mass, on the lower end of the range, and on the upper end, as long as the proportion of resin is sufficient to knit the mass together upon curing to form a consolidated mass of good strength. In general, it has been found that at least 5 percent by volume of the total volume of the composition referred to should comprise metallic material in order appreciably to improve the thermal conductivity, strength, impact resistance and other properties. In general, it has been found that at least 30 percent by volume of the total composition should comprise the resin. We prefer a range of metallic material from about 8 to about 20 percent, by volume, and a range of resin from about 80 to about 92 percent, on the same basis, when employing steel fibers. The corresponding ranges when aluminum fibers are used are from about 25 to about 50 percent of fiber and about 50 to about 75 percent resin.

In many instances, it is desirable to incorporate other fillers of both filamentary and finely-divided form, in order to modify further the molding properties, flow properties (in the mold) and other physical properties of the plastic composition. For this purpose up to two-thirds of the total filler content may comprise other added filler materials. Of course, it is to be understood that only in specialized applications can the actual proportion of continuous metal filaments be below the aforementioned amounts and even then it is preferred that the proportion should not be substantially below this figure. Illustrative fillers which may be employed for this purpose include metallic oxides such as aluminum oxide, glass fabric, glass fiber, silica, asbestos fabric, chopped fabric, paper, clay such as kaolin, bentonite, and treated bentonites such as "Bentone," mica, metal powders, metal plated powders, and resin-impregnated forms of these and other fillers, etc.

It also is sometimes desirable to incorporate in the composition other substances such as natural and synthetic resins and polymers, stabilizers, mold release agents or lubricants, plasticizers, dyes, colored pigments, and the like. The proportion of these materials to be incorporated will, of course, vary with the particular purpose and should be such as not to affect adversely the thermal conductivity of the composition in either its uncured or cured condition.

As the apertured electrodes herein we can employ any metal or alloy which is a good conductor of electricity. Examples of such metals and alloys include copper, steel, aluminum, silver and bronze. By "apertured electrodes" we mean electrodes in the form of woven wire screens, perforated metal sheets, expanded metal sheets, or the like, having apertures substantially uniformly distributed throughout. The apertures may be irregular, round, rectangular, or may have other shapes, or may be a combination of such shapes. The individual apertures should have a minimum linear dimension of at least about 0.025" and a maximum linear dimension not greater than about 0.20". This corresponds approximately to woven wire screen designated as 6 to 20 mesh. It will be understood that when apertured electrodes in other than mesh form, e.g., in the form of perforated metal sheets or expanded metal sheets are used, the number of apertures per unit area should correspond substantially to the number in 6 to 20 mesh screen, if practicable. Where the nature of the perforated metal sheets or expanded metal sheets is such that this number is not practicable, electrodes having fewer, but a practical maximum number of apertures per unit area, may be used.

It was surprising that electrodes in apertured form were found to give the desired results, as solid electrodes of the same metals were inoperable for the purposes of this invention.

If desired, so-called internal electrodes, in addition to the two end electrodes, may be provided in the castings.

The electrodes, including said internal electrodes, are furnished with suitable electrical terminals. These may take any suitable form, such as, for example, metal strap in braid form as used with conventional so-called storage batteries. Conventional methods for electrically connecting the terminals to the apertured electrodes are used.

The bronze wool packing layers may be replaced with layers of any other conducting metal in fiber form, or may be eliminated entirely, if desired. Examples of suitable replacements for the bronze wool layer include copper wool, steel wool, silver wool and aluminum wool.

Additionally, we have found that in place of the aforesaid layers of bronze wool, we can coat both sides of the apertured electrodes with a layer comprising a thermosetting epoxy resin or unsaturated polyester resin, as aforementioned, and, interspersed homogeneously therethrough, short lengths, i.e., from about 1/32″ to about ½″ of heat-conducting metallic material. Such a layer can be applied by forming a coating on the electrode with the resin, and then spraying the metallic filaments in flock form onto and into said coating.

In conducting the method of this invention we place the apertured electrode material along but not against the sides of a mold and, where a metal packing layer is used, we pack each side of each electrode as aforesaid. The mold is then filled with a thermosetting epoxy or polyester resin containing suitable hardeners or catalysts. The system is placed under pressure and permitted to form a consolidated mass under adiabatic conditions; or, if desired, the case may be accelerated by passing an electric current through the casting. The pressure employed varies widely, depending on the nature and relative amounts of the ingredients and the density of the casting desired.

The cure is completed by joining the terminals of the casting to a source of electrical current. Suitably, a transformer which will allow the variation of the current flow and which will permit, preferably, a high current at low voltage, is used in the electric circuit. The current is preferably increased in stages to yield the desired curing temperatures. The current capacity of the particular electrodes employed will also govern the amperage used. In general, we find that electrodes of 6 mesh copper mesh screen have a capacity of about 10 amperes per square inch and are especially advantageous. Voltages from about ¼ to about ½ volts and sufficient amperage to give the desired temperatures are used.

In order to illustrate our invention as exemplified by the presently-preferred embodiments we give the following detailed descriptions and accompanying drawings in which like numbers represent like parts throughout and which form a part hereof.

*Example*

Figure 1:
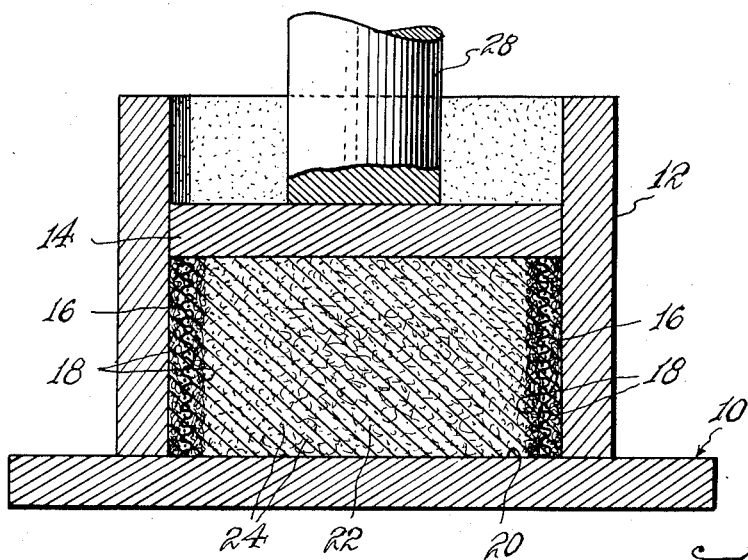
Fig. 1 is a front view, partly in section, showing apparatus and materials employed in carrying out a preferred embodiment of this invention.

With special reference to Fig. 1, a casting in accordance with this invention was prepared as follows:

The internal or parting surfaces of base 10, mold walls 12 and pressure plate 14 were coated with a suitable mold release agent (not shown) such as silicone base material, e. g., that sold by Chemical Development Corporation under the designation, CD–B2.

Two electrodes were fabricated, each consisting of a No. 6 mesh copper screen 16, 2″ x 8″. The electrodes were placed along the longer side of an 8″ x 7″ x 6″ steel mold as shown. Bronze wool 18 to a thickness of about ⅛″ to about ¼″ was packed on each side of each electrode 16.

The mold cavity 20 was then filled with an epoxy composition consisting of a commercial epoxy resin 22 (diglycidyl ether of bisphenol A), e. g., that marketed by Bakelite Company as ERL-2774, said resin containing 19 grams of hardener per 100 grams of resin. The hardener used (ZZLA-0801, Bakelite Company) was an eutectic mixture of 57 parts by weight of metaphenylene diamine, 37 parts by weight of 4,4′-methylene dianiline and 6 parts of bisphenol A.

The total amount of resin and hardener used was 1300 grams. Steel wool 24, grade 1 (Tennant Co.), chopped into 2″ lengths, in an amount of 825 grams, was mixed into the resin 22 and the entire contents of the mold cavity 20 was placed under a pressure of about 300 p.s.i. by means of pressure plate 26 and ram 28, the latter being actuated by conventional pressure means (not shown). Partial curing was allowed to take place under adiabatic conditions for about 4 hours. The resulting casting 30 was rigid and an integrated or consolidated mass.

Figure 2:
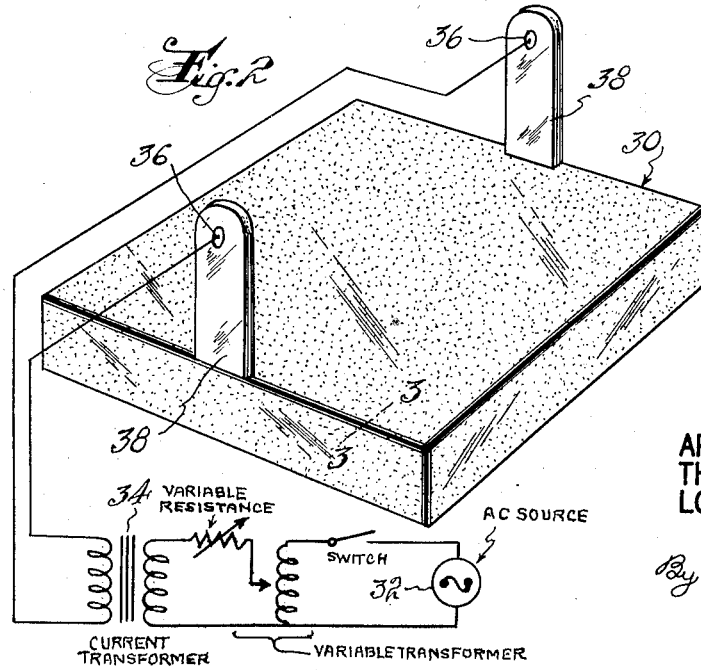
Fig. 2 is a perspective view, schematically showing the electric circuit for conducting step two with the casting of Fig. 1, the sizes of the metal screen and wool being exaggerated for purposes of illustrating this invention.
Figure 3:
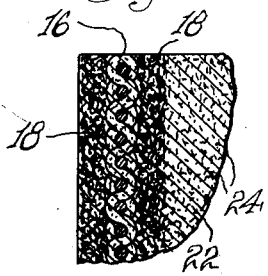
Fig. 3 is an enlarged fragmentary section taken along the line 3—3 of Fig. 2.

As shown in Fig. 2, the casting 30 was placed in series with a source 32 of high electric current, such as a variable transformer and a 500-600 ampere current transformer 34 in series with a variable resistance, by means of connections at the terminals 36 on heavy ground straps 38 silver soldered to the center of the copper screen 16.

The casting 30 was subjected to a voltage of 0.3 volt and to the current and time treatment shown by the following table, with the temperatures induced in the casting being as shown.

| Transformer setting (amps.) | Time (min.) | Temp. (° C.) |
| --- | --- | --- |
| 300 | 10 | 22- 24 |
| 500 | 50 | 24- 71 |
| 600 | 18 | 71-106 |
| 500 | 40 | 106-118 |
| 600 | 180 | 118-172 |

After the foregoing treatment the casting 30 was hard and fully cured. There were no bubbles or fissures in the casting. The casting possessed all of the above-mentioned characteristics of articles made in accordance with this invention. When it was connected through a conventional temperature control element to ordinary house alternating current of 110 volts, stepped down to about 0.3 volt, the casting was found to be capable of giving off radiant heat to a room.

Various modifications in the method of the example may be made. In place of steel wool, other metallic fibrous materials, such as highly conducting aluminum wool, bronze wool, and the like, may be used. Also, the metallic material e.g., aluminum wool, may be used in pre-compressed form. In such case the resin is spread on the pre-form and another pre-form can be placed on top, the whole being molded under suitable temperature and pressure conditions. The resin employed may be a styrenated polyester resin prepared by the reaction of a mixture of phthalic anhydride and maleic anhydride with a mixture of diethylene glycol and propylene glycol, e.g., the styrenated polyester sold under the designation PLL-4264 by the Bakelite Company. As an example, 90 grams of aluminum wool, precompressed to a thickness of about ⅟₁₆″ in a 6″ x 12″ mold at 1000 p.s.i., was covered with 70 grams of a mixture of the just-mentioned styrenated polyester and 20 grams of calcium carbonate (200 mesh or finer), and then covered with another like pre-form. The electrical resistivity of the resulting panel castings averaged $5.0 \times 10^{-6}$ ohm/meter, which is approximately 200 times greater than that of pure aluminum. The castings did not warp or shrink and were satisfactory for use as radiant heaters.

Also, it should be understood that while, for purposes of illustration, we have given in detail embodiments of our invention which have rectangular sides, such as bars, our invention is not limited to any particular configuration, it being sufficient that the materials, etc., used be in accordance with this invention and that the electrodes be so spaced as to permit an electric current to be passed through the casting.

While we have described our invention in detail in its preferred embodiments, it will be obvious to those skilled in the art, after understanding our invention, that various changes and modifications may be made herein without departing from the spirit or scope thereof. We aim in the appended claims to cover all such modifications and changes.

What is claimed is:

1. The method which comprises placing a mixture of metal fibers and a thermosetting resin selected from the group consisting of epoxy resin and polyester resin between apertured electrodes made of an electrically-conducting material, the amount of said metal fibers being sufficient to impart electrical conductivity to said mixture, compressing the mixture for a time sufficient to form a consolidated mass comprising said mixture and said electrodes, and effecting cure of said consolidated mass by directly joining said electrodes to a source of electric current and passing an electric current therethrough to provide the electrodes, metal fibers and the cured resin bonded together as a unitary body.

2. The method as defined in claim 1 wherein said resin is a thermosetting epoxy resin.

3. The method as defined in claim 1 wherein said electrically-conducting material is copper mesh.

4. The method as defined in claim 1 wherein said metal fibers are steel wool.

5. The method as defined in claim 1 wherein a layer of electrically-conducting material in wool form is placed on each side of each of said electrodes prior to placing said mixture of metal fibers and thermosetting resin between said electrodes.

6. The method which comprises placing a mixture of steel wool and a thermosetting epoxy resin between two electrodes of copper mesh screen, the amount of said metal fibers being sufficient to impart electrical conductivity to said mixture, compressing the mixture for a time sufficient to form a consolidated mass comprising said mixture and said electrodes, and effecting cure of said consolidated mass by directly joining said electrodes to a source of electric current and passing an electric current therethrough, to provide the electrodes, metal fibers and the cured resin bonded together as a unitary body.

7. A molded article which comprises a consolidated mass comprising a pair of apertured electrodes, and further comprising distributed therebetween and in contact therewith, a mass of thermoset resin having metal fibers dispersed therein, said electrodes, metal fibers, and resin being bonded together as a unitary body, said resin being selected from the group consisting of an epoxy resin and a polyester.

8. A molded article as defined in claim 7 wherein said resin is an epoxy resin.

9. A molded article as defined in claim 7 wherein said electrodes are copper mesh.

10. A molded article as defined in claim 7 wherein the said metal fibers are steel wool.

11. A molded article as defined in claim 7 wherein a layer of electrically-conducting material in wool form is on each side of each of said electrodes.

12. A radiant heater comprising the molded article of claim 7.

13. A molded article which comprises a consolidated mass comprising a pair of copper mesh electrodes, a layer of bronze wool on each side of each of said electrodes, and distributed therebetween and in contact therewith, a mixture of steel wool and a thermoset epoxy resin.

14. A radiant heater comprising the molded article of claim 13.

References Cited in the file of this patent

UNITED STATES PATENTS

| | | |
|---|---|---|
| 2,278,072 | Gould | Mar. 31, 1942 |
| 2,644,020 | Hamister | June 30, 1953 |
| 2,748,099 | Bruner et al. | May 29, 1956 |
| 2,774,747 | Wolfson et al. | Dec. 18, 1956 |